United States Patent
Hanley et al.

(10) Patent No.: US 8,365,551 B2
(45) Date of Patent: Feb. 5, 2013

(54) VACUUM INSULATOR FOR A REFRIGERATOR APPLIANCE

(75) Inventors: Kenneth Joseph Hanley, Louisville, KY (US); Martin Christopher Severance, Louisville, KY (US); Karthick Srinivasan, Hyderabad (IN); John Alexander Gardner, Louisville, KY (US)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 12/963,986

(22) Filed: Dec. 9, 2010

(65) Prior Publication Data

US 2012/0060543 A1  Mar. 15, 2012

(51) Int. Cl.
*F25D 11/00* (2006.01)
*F28F 13/14* (2006.01)
*F25B 41/06* (2006.01)

(52) U.S. Cl. .............. 62/440; 62/113; 62/513; 165/135; 165/136; 165/164

(58) Field of Classification Search ............... 62/440, 62/113, 513; 165/135, 136, 164
See application file for complete search history.

(56) References Cited

U.S. PATENT DOCUMENTS

| | | | | |
|---|---|---|---|---|
| 1,161,088 A | * | 11/1915 | Vires | 165/135 |
| 2,388,556 A | * | 11/1945 | Lathrop | 62/175 |
| 2,550,040 A | * | 4/1951 | Clar | 165/63 |
| 2,751,197 A | * | 6/1956 | Herrman et al. | 165/230 |
| 3,176,473 A | * | 4/1965 | Andonian | 62/51.1 |
| 3,782,452 A | * | 1/1974 | Ceplon | 165/135 |
| 4,147,037 A | | 4/1979 | Gelbard et al. | |
| 4,792,289 A | * | 12/1988 | Nieratschker | 417/259 |
| 6,094,922 A | * | 8/2000 | Ziegler | 62/50.7 |
| 7,001,005 B2 | * | 2/2006 | Gamberoni et al. | 312/400 |
| 7,975,727 B2 | * | 7/2011 | Adler et al. | 138/114 |
| 2002/0020181 A1 | * | 2/2002 | Ewert et al. | 62/228.4 |
| 2005/0005986 A1 | * | 1/2005 | Topek et al. | 138/115 |
| 2011/0070103 A1 | * | 3/2011 | Allidieres | 417/53 |

\* cited by examiner

*Primary Examiner* — Ljiljana Ciric
*Assistant Examiner* — Alexis Cox
(74) *Attorney, Agent, or Firm* — Dority & Manning, P.A.

(57) ABSTRACT

A vacuum insulator for portions of the refrigeration cycle of a refrigerator appliance is provided. The vacuum insulator can be applied to the suction line leading to the refrigerant compressor, the capillary tube leading to the evaporator inlet, and/or the capillary tube—suction line heat exchanger. An outer insulating layer is used to create a vacuum that serves to insulate the intended portion of the refrigeration cycle.

19 Claims, 3 Drawing Sheets

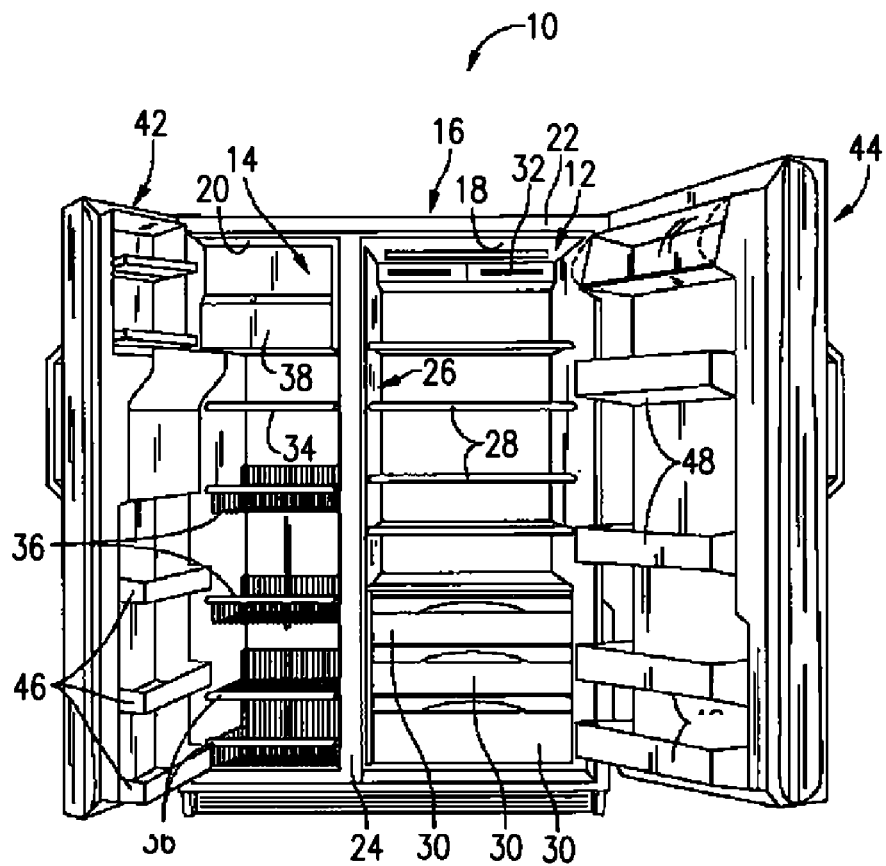
FIG. -1-
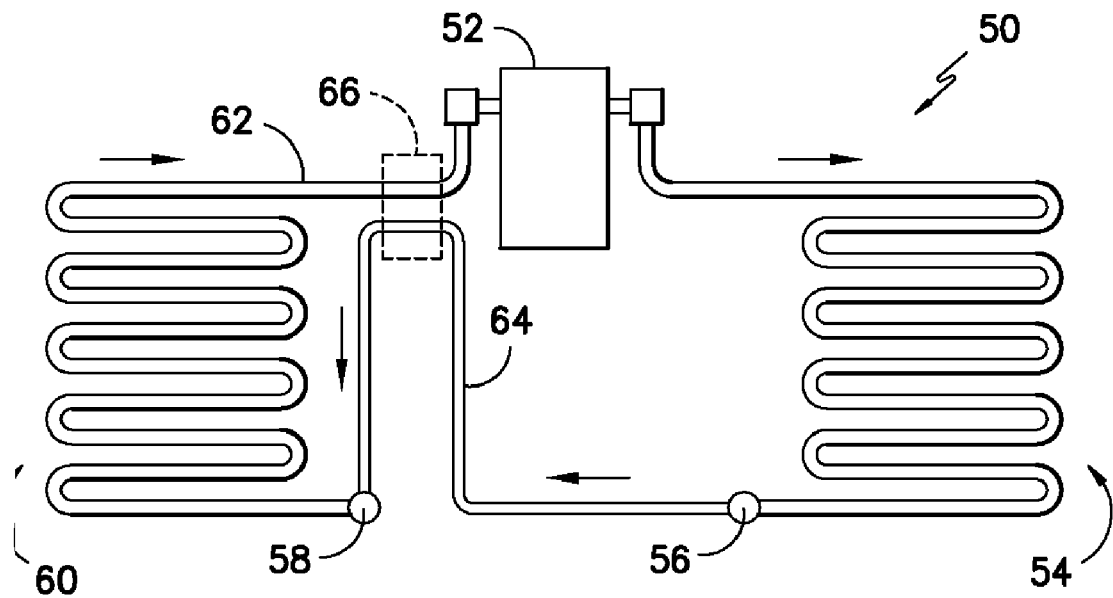
FIG. -2-

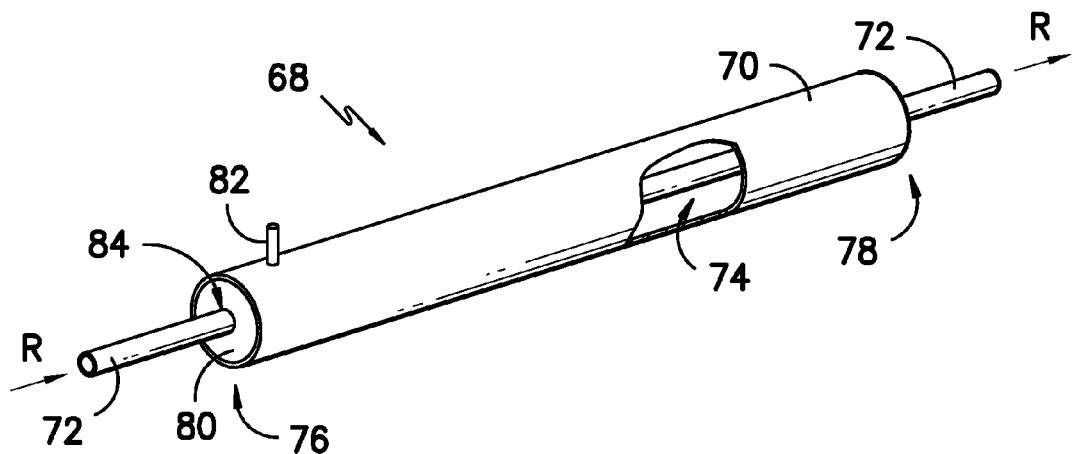
FIG. -3-
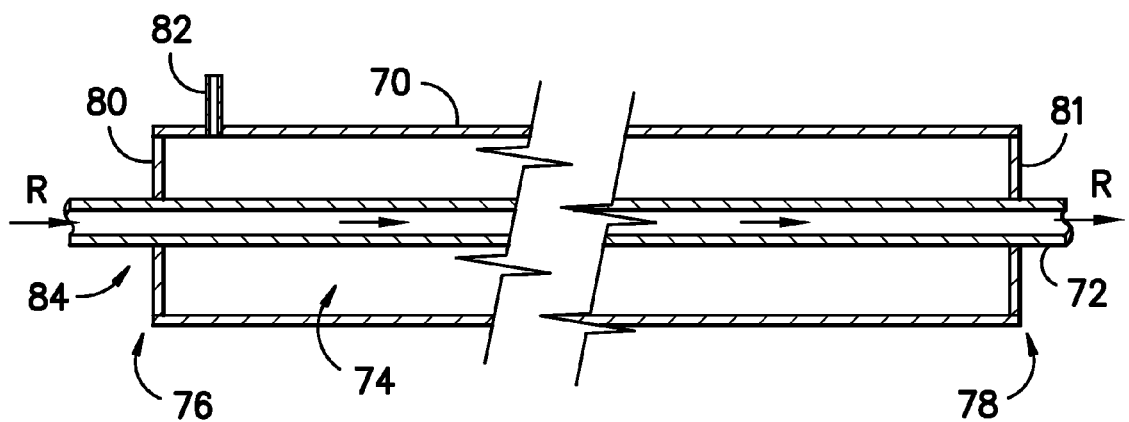
FIG. -4-

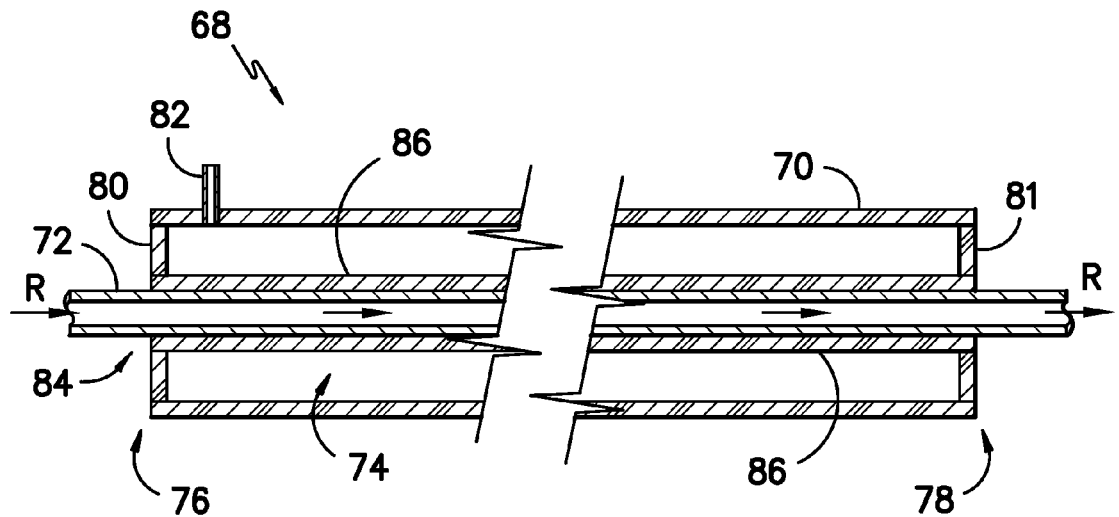
FIG. -5-
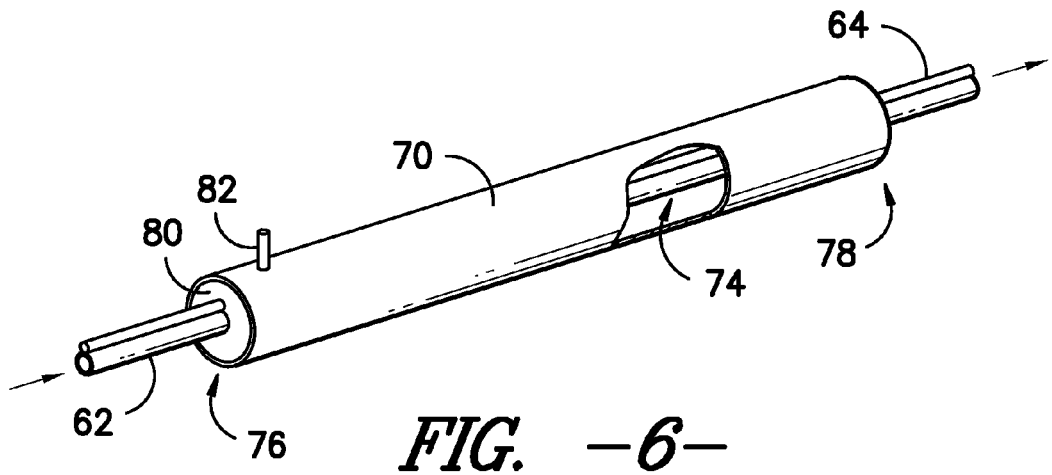
FIG. -6-

VACUUM INSULATOR FOR A REFRIGERATOR APPLIANCE

FIELD OF THE INVENTION

The present invention provides a vacuum insulator for portions of the refrigeration cycle of a refrigerator appliance. More particularly, the present invention provides for a vacuum insulator for the suction line leading to the refrigerant compressor, the capillary tube leading to the evaporator inlet, and/or the capillary tube—suction line heat exchanger.

BACKGROUND OF THE INVENTION

Modern refrigerator appliances use a gas-based refrigerant to provide cooling for the fresh food and/or freezer compartment of the refrigerator. The refrigerant is circulated within a loop that includes passage through the inside compartment(s) of the refrigerator. Heat is withdrawn from inside the refrigerator by changing state from a liquid to a gas in an evaporator. Thereafter, the refrigerant is compressed and subsequently cooled by passage through a heat exchanger—more commonly referred to as a condenser. The condenser is typically exposed to ambient air for heat exchange therewith.

In order to improve efficiency, refrigerators can provide heat exchange between the relatively cool refrigerant vapor conveyed from the evaporator outlet through the suction line to the compressor and the relatively warm liquid refrigerant conveyed from the condenser outlet through the capillary tube to the evaporator inlet. This heat exchange improves the thermodynamic efficiency of the refrigeration system by cooling liquid refrigerant before it enters the evaporator. Because the cold gaseous refrigerant passing through the suction line is warmed to at least ambient temperature as it passes from within the insulated space of the refrigerator to the compressor inlet, the residual refrigeration effect of the cold suction line gas might otherwise be wasted if not used to cool the warmer liquid refrigerant exiting the condenser. The heat exchange technique between gaseous and liquid refrigerant is sometimes termed "suction-capillary tube heat exchange."

Several techniques can be used for placing the suction line and capillary tube into thermal contact for heat exchange therebetween. By way of example, one technique includes affixing the capillary tube to the outside of the suction line. Another technique for providing a suction line/capillary tube assembly for heat exchange is to pass the capillary tube inside the suction line in heat exchange relationship with the gaseous refrigerant passing therethrough. This is sometimes termed a "coaxial" heat exchange, although actually the capillary tube is not necessarily precisely centered within the suction line. The capillary tube may even contact the interior surface of the suction line at random points. As used herein, suction-capillary tube heat exchanger refers to these and other assemblies where the suction line and capillary tube are placed into thermal contact with each other for heat exchange therebetween.

Using either technique, the suction-capillary tube heat exchanger can be placed e.g., within the foamed-in insulation of a refrigerator located between the outer case and the inner liner forming the interior of the refrigerator or otherwise encased in a foam sleeve and positioned along an exterior of the refrigerator. By insulating the heat exchanger, more heat can be efficiently transferred from the capillary tube to the suction line rather having the suction line absorb heat from the environment, which would necessarily reduce its capacity to absorb heat from refrigerant in the capillary tube.

Similarly, to further improve efficiency, it is desirable to insulate the cold suction line as it leaves the evaporator in order to maintain its relatively cooler temperature before reaching the compressor or the suction line/capillary tube heat exchanger. In addition, for certain applications, it is likewise desirable to insulate the capillary tube coming from the condenser. For example, it may be necessary to route the capillary tube through the machinery compartment after the condenser. Because the machinery compartment can be relatively warm due to the compressor, insulation may be required. Again, for either the suction line or the capillary tube, foam insulation may be used.

However, there can be certain drawbacks to the use of foam insulation—whether such is wrapped around an element or such element is placed in the foam between the outer and inner liner. For example, foam is an imperfect insulator that will still allow for a certain amount of heat transfer. In addition, if the foam becomes wet due to e.g., condensation, the insulation ability of the foam is decreased and becomes worse as the amount of condensation in or on the foam increases. For instance, condensation can occur when the foam is cooled below the dew point by the refrigerant in the suction line to the compressor.

Accordingly, an insulator that provides for improved thermal efficiency in insulating portions of the refrigeration cycle of a refrigerator appliance would be useful. Such an insulator that can be readily installed either along the exterior of refrigerator or in the space between the outer case and the inner liner would also be beneficial. An insulator that can reduce the operating costs of a refrigerator by improving the refrigerator's thermal efficiency would also be very useful.

BRIEF DESCRIPTION OF THE INVENTION

Aspects and advantages of the invention will be set forth in part in the following description, or may be obvious from the description, or may be learned through practice of the invention.

In one exemplary embodiment, the present invention provides a refrigerator having a vacuum insulator. The refrigerator includes a refrigeration cycle that has a condenser, an evaporator, a compressor, a suction line supplying refrigerant flowing from the evaporator to the compressor, and a capillary tube providing refrigerant flowing from the condenser to the evaporator. An outer conduit is included with an inner conduit received within the outer conduit such that an annular space is positioned between the outer conduit and the inner conduit along at least a portion of the length of the outer conduit. A pair of seals is positioned at the ends of the outer conduit. The pair of seals is configured for connection to the outer conduit and extend to the inner conduit so as to enclose at least a portion of the annular space. The annular space is evacuated so as to create a vacuum enclosed within the pair of seals, the outer conduit, and the inner conduit. The inner conduit forms at least a portion of the suction line, the capillary tube, or both of the refrigeration cycle.

In another exemplary embodiment, the present invention provides another refrigerator having a vacuum insulator. The refrigerator includes a refrigeration loop that includes a heat exchange portion between a refrigerant line leading to a compressor and a refrigerant line coming from a condenser. The heat exchanger portion is at least partially received within an outer conduit. A pair of seals is positioned at the ends of the outer conduit. The pair of seals is configured for connection to the outer conduit and the inner conduit so as to enclose at least a portion of the annular space, the annular space being evacuated so as to create a vacuum enclosed within the pair of seals, the outer conduit, and the heat exchange portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates an exemplary embodiment of a refrigerator having a vacuum insulator.

FIG. 2 is a schematic of an exemplary refrigeration loop or cycle.

FIGS. 3-6 provide exemplary embodiments of vacuum insulators according to the present invention. FIGS. 3 and 6 provide perspective views with a partial cut-out of the outer conduit. FIG. 4 is a cross-sectional view of the embodiment of FIG. 3. FIG. 5 is a cross-sectional view of another exemplary embodiment of a vacuum insulator according to the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front view of a representative refrigerator 10 as can be used with an exemplary embodiment of a vacuum insulator of the present invention. For illustrative purposes, the present invention is described with a refrigerator 10 having a construction as shown and described further below. As used herein, a refrigerator includes appliances such as a freezer, refrigerator/freezer combination, compact, and any other style or model of a refrigerator. Accordingly, other configurations including multiple and different styled compartments could be used with refrigerator 10, it being understood that the configuration shown in FIG. 1 is by way of example only.

Refrigerator 10 includes a fresh food storage compartment 12 and a freezer storage compartment 14. Freezer compartment 14 and fresh food compartment 12 are arranged side-by-side within an outer case 16 and defined by inner liners 18 and 20 therein. A space between case 16 and liners 18 and 20, and between liners 18 and 20, is filled with foamed-in-place insulation. Outer case 16 normally is formed by folding a sheet of a suitable material, such as pre-painted steel, into an inverted U-shape to form top and side walls of case 16. A bottom wall of case 16 normally is formed separately and attached to the case side walls and to a bottom frame that provides support for refrigerator 10. Inner liners 18 and 20 are molded from a suitable plastic material to form freezer compartment 14 and fresh food compartment 12, respectively. Alternatively, liners 18, 20 may be formed by bending and welding a sheet of a suitable metal, such as steel. The illustrative embodiment includes two separate liners 18, 20 as it is a relatively large capacity unit and separate liners add strength and are easier to maintain within manufacturing tolerances. In smaller refrigerators, a single liner is formed and a mullion 24 spans between opposite sides of the liner to divide it into a freezer compartment and a fresh food compartment.

A breaker strip 22 extends between a case front flange and outer front edges of liners 18, 20. Breaker strip 22 is formed from a suitable resilient material, such as an extruded acrylo-butadiene-styrene based material (commonly referred to as ABS). The insulation in the space between liners 18, 20 is covered by another strip of suitable resilient material, which also commonly is referred to as a mullion 24. In one embodiment, mullion 24 is formed of an extruded ABS material. Breaker strip 22 and mullion 24 form a front face, and extend completely around inner peripheral edges of case 16 and vertically between liners 18, 20. Mullion 24, insulation between compartments, and a spaced wall of liners separating compartments, sometimes are collectively referred to herein as a center mullion wall 26. In addition, refrigerator 10 includes shelves 28 and slide-out storage drawers 30, sometimes referred to as storage pans, which normally are provided in fresh food compartment 12 to support items being stored therein.

Refrigerator 10 is controlled by a microprocessor (not shown) according to user preference via manipulation of a control interface 32 mounted in an upper region of fresh food storage compartment 12 and coupled to the microprocessor. A shelf 34 and wire baskets 36 are also provided in freezer compartment 14. In addition, an ice maker 38 may be provided in freezer compartment 14.

A freezer door 42 and a fresh food door 44 close access openings to fresh food and freezer compartments 12, 14, respectively. Each door 42, 44 is mounted to rotate about its outer vertical edge between an open position, as shown in FIG. 1, and a closed position (not shown) closing the associated storage compartment. Freezer door 42 includes a plurality of storage shelves 46, and fresh food door 44 includes a plurality of storage shelves 48.

Refrigerator 10 includes a machinery department that incorporates at least part of a refrigeration cycle 50 as shown in FIG. 2. The components of refrigeration cycle 50 include a compressor 52, a condenser 54, valves 56 and 58, and an evaporator 60—all connected in series and charged with a refrigerant. Evaporator 60 is also a type of heat exchanger which transfers heat from air passing over the evaporator 60 to a refrigerant flowing through evaporator 60 thereby causing the refrigerant to vaporize. As such, cooled air is produced and configured to refrigerate compartments 12, 14 of refrigerator 10.

From evaporator 60, vaporized refrigerant flows to compressor 52, which increases the pressure of the refrigerant. This compression of the refrigerant raises its temperature, which is subsequently lowered by passing the gaseous refrigerant through condenser 54 where heat exchange with ambient air takes place so as to cool the refrigerant. Valves 56 and 58 further reduce the pressure of refrigerant leaving condenser 60 before being fed as a liquid to evaporator 60. The refrigeration cycle 50 depicted in FIG. 2 is provided by way of example only. It is within the scope of the present invention for other configurations of the refrigeration system 50 to be used as well.

As previously indicated, refrigerant leaves evaporator 60 as a relatively cool vapor that can be used to receive heat energy from the relatively warm liquid refrigerant leaving condenser 54. More specifically, by providing heat exchange between the suction line 62 feeding compressor 52 and the capillary tube 64 from condenser 54, the energy efficiency of refrigerator 10 is improved. Accordingly, as shown schematically in FIG. 2, a suction-capillary tube heat exchanger 66 is provided to further cool liquid leaving condenser 54 before entering evaporator 60.

In order to improve the thermal efficiency of refrigerator 10, it is desirable to insulate certain portions of the refrigeration cycle 50. For example, efficiency can be improved by insulating heat exchanger 66 so that the relatively cool refrigerant vapor in suction line 62 receives heat from capillary tube 64 rather other sources such as e.g., components of the refrigerator that do not need cooling. Additionally, as previously mentioned, efficiency may be improved by insulating other portions of suction line 62 and/or capillary tube 64 as well.

Accordingly, FIGS. 3 and 4 illustrate an exemplary embodiment of a vacuum insulator 68 of the present invention. Insulator 68 includes an outer conduit 70 and an inner conduit 72. In order to form an annular space 74, inner conduit 72 is received within outer conduit 70. Accordingly, annular space 74 is formed along the length of outer conduit 70.

Outer conduit 70 defines a pair of ends 76 and 78. A circular seal 80 is positioned at end 76 of the outer conduit 70. Seal 80 extends between, and is connected to, outer conduit 70 and inner conduit 72. A similar seal 81 (FIG. 4) is positioned at the other end 78 of outer conduit 70. Arrows R indicate the movement of refrigerant through inner conduit 72.

A terminal 82 is positioned on outer conduit 70 and is in fluid communication with annular space 74. Accordingly, terminal 82 may be used for drawing a vacuum on annular space 74 so to evacuate air therefrom. Terminal 82 can be provided with various configurations for maintaining an airtight seal in annular space 74.

The vacuum in annular space 74 operates as a highly efficient insulator for refrigerant flowing (arrows R) through inner conduit 72, substantially reducing the transfer of heat with the refrigerant by conduction. As such, to improve the thermal efficiency of refrigerator 10, insulator 68 may be used on suction line 62 and/or capillary tube 64 or other places as needed for improving the efficiency of refrigeration cycle 50. More particularly, inner conduit 72 can be connected to, or form a portion of, suction line 62 and/or capillary tube 64.

Insulator 68 may be contained the in space between outer case 16 and inner liners 18 or 20. Typically, such space is filled with a foamed-in insulation, and insulator 68 may be positioned therein. Alternatively, insulator 68 may be located on the exterior of refrigerator 10 or within its machinery compartment as needed.

A variety of construction techniques may be used for insulator 68. Materials may include plastic or metal. Seal 80 can be constructed as a disk or cap attached to outer conduit 70 and having an opening 84 (FIG. 3) for the receipt of inner conduit 72. Alternatively, insulator 68 may be constructed as an integral piece with seals 80 and outer conduit 70 e.g., molded as a single piece into which inner conduit 72 is inserted. Using the teachings disclosed herein, it will be understood that other constructions may be used as well.

By way of example, FIG. 5 provides another illustration of an exemplary embodiment of insulator 68. As with the exemplary embodiment of FIGS. 3 and 4, insulator 68 includes an inner conduit 72 received within outer conduit 70. A vacuum is created in annular space 74. For this exemplary embodiment, however, outer conduit 70 includes an interior wall 86 along its length that contacts the inner conduit 72. As such, the embodiment of FIG. 5 may allow for a useful construction technique in which inner conduit 72 is inserted into outer conduit 70.

Insulator 68 may also be used for the suction-capillary tube heat exchanger 66. Referring now to FIG. 6, insulator 68 includes an outer conduit 70 with seals 80 and 81 (not shown) as previously described. However, instead of a single, inner conduit, a portion of both capillary tube 64 and suction line 62 are received within outer conduit 70. Annular space 74 is evacuated to provide for vacuum insulation of heat exchanger 66. Accordingly, the exemplary embodiment of FIG. 6 provides for greater thermal efficiency be ensuring that the cooler vapor in suction line 62 primarily receives heat from capillary tube 64 rather than other elements of refrigerator 10 or the environment.

FIG. 6 shows capillary tube 64 attached (e.g., by welding or soldering) to suction line 62. However, other constructions may be used such as e.g., routing capillary tube 64 within suction line 62. In addition, the present invention may also be used to provide insulation for other sealed system components of an appliance as well and is not limited to only the suction-capillary tube heat exchanger portion of a refrigerator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator having a vacuum insulator, comprising:
   a refrigeration loop that comprises a condenser, an evaporator, a compressor, a suction line supplying refrigerant flowing from the evaporator to the compressor, and a capillary tube providing refrigerant flowing from the condenser to the evaporator;
   an outer conduit;
   an inner conduit received within said outer conduit such that an annular space is positioned between said outer conduit and said inner conduit along at least a portion of the length of said outer conduit; and
   a pair of seals positioned at the ends of said outer conduit, said pair of seals configured for connection to said outer conduit and said inner conduit so as to enclose at least a portion of the annular space and fix the position of the inner conduit within the outer conduit, the annular space being evacuated so as to create a vacuum enclosed within said pair of seals, said outer conduit, and said inner conduit;
   wherein said inner conduit forms at least a portion of the suction line or the capillary tube.

2. A refrigerator having a vacuum insulator as in claim 1, wherein said annular space is positioned between said outer conduit and said inner conduit along the entire length of the outer conduit that is between the pair of seals.

3. A refrigerator having a vacuum insulator as in claim 1, wherein said outer conduit defines a pair of ends, and wherein said pair of seals each comprise a circular disk attached at the ends of said outer conduit and extending to said inner conduit.

4. A refrigerator having a vacuum insulator as in claim 1, wherein said inner conduit and said outer conduit comprise metal tubing.

5. A refrigerator having a vacuum insulator as in claim 1, wherein said inner conduit and said outer conduit comprise a plastic material.

6. A refrigerator having a vacuum insulator as in claim 1, wherein said pair of seals and said outer conduit are integrally formed.

7. A refrigerator having a vacuum insulator as in claim 1, further comprising a terminal positioned on said outer conduit or said pair of seals, said terminal in communication with said annular space such that said terminal may be used for evacuating said annular space.

8. A refrigerator having a vacuum insulator as in claim 1, wherein said outer conduit defines a pair of ends, and wherein said pair of seals each comprise a circular disk that is welded to a respective end of said outer conduit and extends to said inner conduit.

9. A refrigerator having a vacuum insulator as in claim 1, wherein said outer conduit includes an interior wall extending along the length of said outer conduit, said interior wall being in contact with said inner conduit along the length of said outer conduit.

10. A refrigerator having a vacuum insulator as in claim 1, wherein said seals are configured as caps attached to the ends of said outer conduit, said caps defining openings for the passage through of said inner conduit.

11. A refrigerator having a vacuum insulator, comprising:
    an outer conduit extending along a longitudinal direction;
    a refrigeration loop that comprises a heat exchange portion located at least partially within said outer conduit and forming an annular space between said heat exchange portion and said outer conduit, said heat exchange portion comprising:
        a refrigerant suction line for supplying refrigerant to a compressor;
        a refrigerant capillary line for supplying refrigerant from a condenser, the refrigerant capillary line in contact with the refrigerant suction line so as to provide conductive heat transfer therebetween; and
    a pair of seals positioned at the ends of said outer conduit, said pair of seals configured for connection to said outer conduit and said heat exchange portion so as enclose at least a portion of the annular space, the annular space being evacuated so as to create a vacuum enclosed within said pair of seals, said outer conduit, and the heat exchange portion.

12. A refrigerator having a vacuum insulator as in claim 11, wherein said annular space is positioned between said outer conduit and said inner conduit along an entire length of the outer conduit that is positioned between the pair of seals.

13. A refrigerator having a vacuum insulator as in claim 11, wherein said outer conduit defines a pair of ends, and wherein said pair of seals each comprises a circular disk attached at the ends of said outer conduit and extending to the heat exchange portion.

14. A refrigerator having a vacuum insulator as in claim 11, wherein the heat exchange portion and said outer conduit comprise metal tubing.

15. A refrigerator having a vacuum insulator as in claim 11, wherein the heat exchange portion and said outer conduit comprise plastic tubing.

16. A refrigerator having a vacuum insulator as in claim 11, wherein said pair of seals and said outer conduit are integrally formed.

17. A refrigerator having a vacuum insulator as in claim 11, further comprising a terminal positioned on said outer conduit or said pair of seals, said terminal in communication with said annular space such that said terminal may be used for evacuating said annular space.

18. A refrigerator having a vacuum insulator as in claim 11, wherein said refrigerant suction line and refrigerant capillary line are welded together.

19. A refrigerator having a vacuum insulator as in claim 11, wherein said seals are configured as caps attached to the ends of said outer conduit, said caps defining openings for the passage through of the heat exchanger portion.

* * * * *